United States Patent [19]

Cernia et al.

[11] 4,047,702
[45] Sept. 13, 1977

[54] DEVICE FOR ABSORBING IMPACT ENERGY

[75] Inventors: Enrico Cernia, Rome; Walter Conti, San Donato Milanese (Milan), both of Italy

[73] Assignee: Snam Progetti S.P.A., Italy

[21] Appl. No.: 657,694

[22] Filed: Feb. 12, 1976

[30] Foreign Application Priority Data

Feb. 12, 1975 Italy .................................. 20192/75

[51] Int. Cl.² .......................................... E01F 15/00
[52] U.S. Cl. .................................. 256/13.1; 256/19; 244/110 C
[58] Field of Search .......................... 256/13.1, 19, 1; 244/110 C, 110 R; 404/6, 9

[56] References Cited

U.S. PATENT DOCUMENTS

| 2,136,710 | 11/1938 | Robertson | 256/13.1 |
| 2,440,574 | 4/1948 | Cotton | 256/1 X |
| 2,450,328 | 9/1948 | Cotton | 244/110 R |
| 2,465,936 | 3/1949 | Schultz | 256/13.1 X |

Primary Examiner—Andrew V. Kundrat
Attorney, Agent, or Firm—Morgan, Finnegan, Pine, Foley & Lee

[57] ABSTRACT

The invention relates to a device for absorbing impact energy and more particularly to a device to be mounted to a conventional guard rail structure. The device consists of a skein of yarn of undrawn synthetic polymer and preferably nylon 6. The yarn is passed through the holes of a plate which, in turn, is mounted in a gap of a conventional guard rail structure. The weight of the skein is related to the amount of impact energy to be absorbed.

3 Claims, 1 Drawing Figure

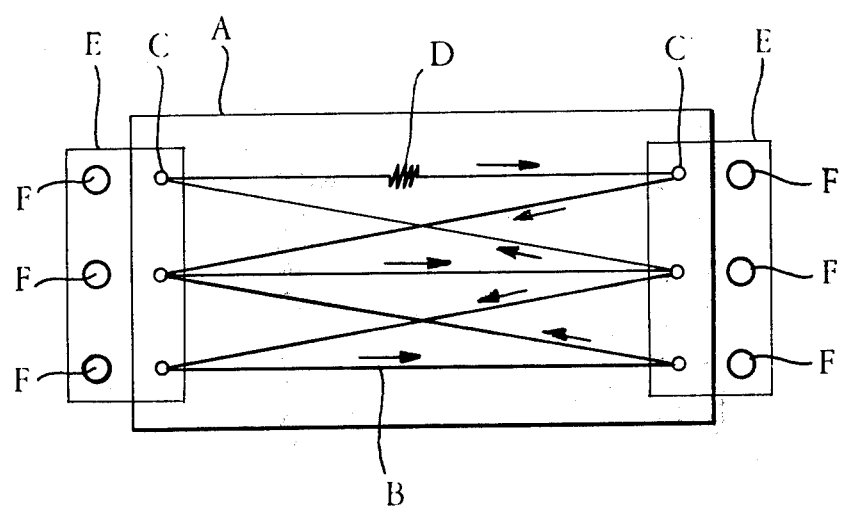

DEVICE FOR ABSORBING IMPACT ENERGY

The present invention relates to a device for absorbing the energy generated by impact forces. More particularly, the present invention relates to a new type of guard rail, which permits most of the energy received from the impact of a vehicle to be absorbed.

Conventional guard rails essentially comprise either a concrete barrier or a continuous belt of metal drawn material mounted at regular intervals to supports. The conventional guard rails fulfill their protective function by preventing the vehicles from going off the road. At the same time they do not dissipate the impact of energy. In such cases the impact is absorbed by the vehicle with the evident negative consequences for the vehicles and the passengers.

For a better understanding of the present invention which overcomes these deficiencies, the following disclosure shall be considered in connection with a guard rail. However, the present invention is not limited to this embodiment. Generally the present invention can be used for the absorption of forces generated upon impact to objects and people.

With respect to the new type of guard rail it has now been found that the rails almost completely absorb the impact while the vehicle undergoing the impact is surely and quickly braked.

This new guard rail essentially comprises a metal drawn belt, which is mounted in position by means of suitable supports, as in the conventional case, with gaps provided between two supports within, these gaps there is a skein of yarn of an undrawn synthetic polymer. In fact skeins of undrawn yarns of polymeric polyesters, polyacrylates, polyethylene, isotactic polypropylene, can be used. The best results have been obtained with polyamide polymers, such as nylon 4, nylon 6, nylon 6.6, nylon 6.10. It has more particularly been found that an undrawn nylon 6 yarn, having a moisture content higher than 2%, is capable of absorbing up to 15 kgm of energy per cubic centimeter of material without practical release of the energy after the impact. The curve of the specific enery (kgm/cc) as a function of the extension, as determined by experimental tests, is, within the limits of interest, practically independent of type of impact (transverse, longitudinal and under various angles), the impact speed and the amount of yarn.

With reference to the figure there is schematically illustrated a device which embodies the present invention for a particular type of a guard rail. This particular embodiment is disclosed for illustrative purpose, but does not limit the scope of the invention.

The rail includes a seal tight box A filled with water for maintaining the fibers of undrawn nylon 6 at a a moisture content greater than 2%. The fiber B of undrawn nylon 6, wound in form of a skein, forms the gap provided in the standard structure of the guard rail. The fiber is wound by passing it through the holes C and is then tightened by means of the binding D. In this point case the fiber also can be drawn. In the plates E, besides the holes C there are provided holes F for forming the anchoring points to the conventional guard rail structure. The total cross-section of the undrawn fiber is calculated so as to give the skein a weight which corresponds to the energy to be dissipated.

We claim:

1. A device for absorbing impact energy, comprising a water filled seal tight box, a plate secured to each end of said box having spaced holes therethrough, yarn of undrawn nylon 6 contained in said box and having a moisture content higher than two percent which is maintained at that level by the water in said box and which is wound in the form of a skein across said box by having said yarn pass through said holes in said plates, and wherein said yarn absorbs energy upon impact, and spaced guard rail structures between which and to which said box, plate and impact absorbing yarn are secured.

2. The device according to claim 1 wherein the weight of said skein of yarn is sufficient to absorb 15 Kgm of energy per cubic centimeter of said yarn.

3. The device according to claim 1 wherein there are a plurality of sets of guard rails with said impact absorbing device between each set of rails.

* * * * *